(12) United States Patent
Kawase et al.

(10) Patent No.: US 11,688,531 B2
(45) Date of Patent: Jun. 27, 2023

(54) DRAWING CREATION METHOD, WIRE HARNESS MANUFACTURING METHOD, AND DRAWING CREATION DEVICE

(71) Applicant: PROTERIAL, LTD., Tokyo (JP)

(72) Inventors: Kenji Kawase, Tokyo (JP); Katsuju Aoki, Tokyo (JP); Raifu Yamamoto, Tokyo (JP)

(73) Assignee: Proterial, Ltd., Tokyo (JP)

( * ) Notice: Subject to any disclaimer, the term of this patent is extended or adjusted under 35 U.S.C. 154(b) by 198 days.

(21) Appl. No.: 16/706,970

(22) Filed: Dec. 9, 2019

(65) Prior Publication Data
US 2020/0185130 A1 Jun. 11, 2020

(30) Foreign Application Priority Data

Dec. 11, 2018 (JP) ................................ 2018-231506

(51) Int. Cl.
*H01B 13/012* (2006.01)
*G06F 30/10* (2020.01)
(Continued)

(52) U.S. Cl.
CPC ....... *H01B 13/01209* (2013.01); *G06F 30/10* (2020.01); *G06F 30/15* (2020.01); *G06F 2113/16* (2020.01)

(58) Field of Classification Search
CPC ........ H01B 13/01209; H01B 13/01227; G06F 30/10
See application file for complete search history.

(56) References Cited

U.S. PATENT DOCUMENTS

| | | | | |
|---|---|---|---|---|
| 4,190,890 A | * | 2/1980 | Marx | ............... H01B 13/01227 29/720 |
| 5,568,269 A | * | 10/1996 | Jamzadeh | ............... H04N 1/56 382/299 |
| 2019/0118741 A1 | | 4/2019 | Kawase et al. | |

FOREIGN PATENT DOCUMENTS

| | | |
|---|---|---|
| EP | 1275565 A1 | 1/2003 |
| EP | 3065071 A1 | 9/2016 |

(Continued)

OTHER PUBLICATIONS

Extended European Search Report dated May 12, 2020, issued in corresponding European Patent Application No. 19214101.8.
(Continued)

*Primary Examiner* — Livius R. Cazan
(74) *Attorney, Agent, or Firm* — Meunier Carlin & Curfman LLC

(57) ABSTRACT

Provided are a drawing creation method, a wire harness manufacturing method, and a drawing creation device. A drawing showing a wire harness is created by the drawing creation method. The wire harness is configured with wires bundled together. The wire harness includes wire branch points and branch lines. The drawing is created based on information including following (1) to (3) and at least one of following (4) or (5): (1) a path of the wire harness in a movable body, (2) a distance between path branch points where the path branches, (3) a length from each path branch point to a corresponding connection target of the wire harness, (4) identification information of the connection target of the wire harness, (5) identification information of the connection target of each wire. The drawing reflects a distance between the wire branch points and a length of each branch line.

6 Claims, 10 Drawing Sheets

(51) Int. Cl.
  *G06F 113/16*  (2020.01)
  *G06F 30/15*  (2020.01)

(56) References Cited

FOREIGN PATENT DOCUMENTS

| JP | 2015191387 A | 11/2015 |
| JP | 2016-206870 A | 12/2016 |
| JP | 6414768 B1 | 10/2018 |

OTHER PUBLICATIONS

RapidHarness: "Rapid Harness Tutorial: Designing Harnesses", dated Jul. 15, 2016; URL:https://www.youtube.com/watch?v=x5dalL7qtmM [retrieved on Apr. 28, 2020], 1 page.

Srikumar et al., "CATIA V5 Electrtical Domain Overview", EDS Technologies, Jan. 1, 2007; URL:https://www.edstechnologies.com/Mailer/june12/PF_2_CATIAV5_ELECTRICAL.pdf [retrieved on Apr. 28, 2020], 18 pages.

Notice of Reasons for Refusal issued in Japanese Application No. 2018231506, dated May 17, 2022, 9 pages.

European Search Report issued for European Application No. 19214101.8, dated Mar. 3, 2022.

Dassault Systemes: "Equipment and Systems Engineering—Electrical DOMAIN—Cumulative Overview CATIA Version 5 Release 14", 2015, XP055894904, Retrieved [on Feb. 23, 2022] from the Internet: URL:https://www.yumpu.com/en/document/view/23971592/electrical- domain-overview-presentation-catia-v5r13-ks-design.

Office Action Issued by State Intellectual Property Office of China dated May 13, 2022 (with English Transiation).

Second Office Action issued in the corresponding Chinese Patent Application No. 201911236902.4 dated Aug. 29, 2022.

Office Action issued in the corresponding Chinese Patent Application No. 201911236902.4, dated Dec. 12, 2022.

Decision of Refusal for Chinese Patent Application No. 201911236902.4 dated Mar. 11, 2023 (translation included).

\* cited by examiner

| WIRE NAME | ONE CONNECTION TARGET | | THE OTHER CONNECTION TARGET | |
|---|---|---|---|---|
| | DEVICE NAME | TERMINAL NUMBER | DEVICE NAME | TERMINAL NUMBER |
| WIRE W1 | A | N1 | B | N1 |
| WIRE W2 | A | N2 | C | N1 |
| ... | | | | |

FIG. 3

| ID | Length (mm) | X1 | Y1 | X2 | Y2 |
|---|---|---|---|---|---|
| 001 | 114 | 0 | 20 | 100 | 55 |
| | ⋮ | | | | |
| 008 | 83 | 130 | 55 | 100 | 132 |
| 009 | 137 | 130 | 55 | 267 | 55 |

FIG. 7

DRAWING CREATION METHOD, WIRE HARNESS MANUFACTURING METHOD, AND DRAWING CREATION DEVICE

CROSS-REFERENCE TO RELATED APPLICATIONS

This application claims the benefit of Japanese Patent Application No. 2018-231506 filed on Dec. 11, 2018 with the Japan Patent Office, the entire disclosure of which is incorporated herein by reference.

BACKGROUND

The present disclosure relates to a drawing creation method, a wire harness manufacturing method, and a drawing creation device.

Wire harnesses are used for movable bodies and so on. As described in Japanese Unexamined Patent Application Publication No. 2016-206870 (Patent Document 1), in a process of manufacturing the wire harness, a drawing showing the wire harness is required. An exemplary method for creating the drawing showing the wire harness is as follows.

Firstly, a distance between devices to be connected by the wire harness is obtained. The distance between the devices is obtained by measuring the distance between the devices in an actual movable body, or by calculating the distance between the devices based on a drawing of the movable body.

Next, a sketch drawing of the wire harness is manually created based on the distance between the devices. Subsequently, the drawing showing the wire harness is manually created using a drawing creation tool, such as CAD software, with reference to the sketch drawing.

SUMMARY

Creation of the drawing showing the wire harness by the above-described method requires time and effort. In one aspect of the present disclosure, it is desirable to provide a drawing creation method enabling easy creation of a drawing showing a wire harness, a wire harness manufacturing method, and a drawing creation device.

One aspect of the present disclosure is a drawing creation method, comprising:

creating a drawing showing a wire harness, the wire harness being configured with wires bundled together, the wire harness comprising:

wire branch points where part of the wires branches off; and branch lines each extending from an end of a corresponding wire to a corresponding wire branch point, the drawing reflecting a distance between the wire branch points and a length of each branch line, based on information including following (1) to (3) and at least one of following (4) or (5):

(1) a path of the wire harness in a movable body;

(2) a distance between path branch points where the path branches;

(3) a length from each path branch point to a corresponding connection target of the wire harness;

(4) identification information of the connection target of the wire harness;

(5) identification information of the connection target of each wire.

Another aspect of the present disclosure is a drawing creation device configured to create a drawing showing a wire harness, the wire harness being configured with wires bundled together, the wire harness including:

wire branch points where part of the wires branches off; and branch lines each extending from an end of a corresponding wire to a corresponding wire branch point, the drawing creation device comprising:

an information acquirer configured to acquire information including following (1) to (3) and at least one of following (4) or (5):

(1) a path of the wire harness in a movable body;

(2) a distance between path branch points where the path branches;

(3) a length from each path branch point to a corresponding connection target of the wire harness;

(4) identification information of the connection target of the wire harness;

(5) identification information of the connection target of each wire; and a drawing creator configured to create the drawing reflecting a distance between the wire branch points and a length of each branch line, based on the information acquired by the information acquirer.

Effects of the Invention

The drawing creation method according to one aspect of the present disclosure enables easy creation of the drawing showing the wire harness. The drawing creation device according to another aspect of the present disclosure enables easy creation of the drawing showing the wire harness.

BRIEF DESCRIPTION OF THE DRAWINGS

An example embodiment of the present disclosure will be described below with reference to the accompanying drawings, in which:

FIG. 3 is an explanatory diagram showing a wiring table;

FIG. 7 is an explanatory diagram showing line segment information;

DETAILED DESCRIPTION OF EXEMPLARY EMBODIMENTS

1. Drawing Creation Method

Figure 1:
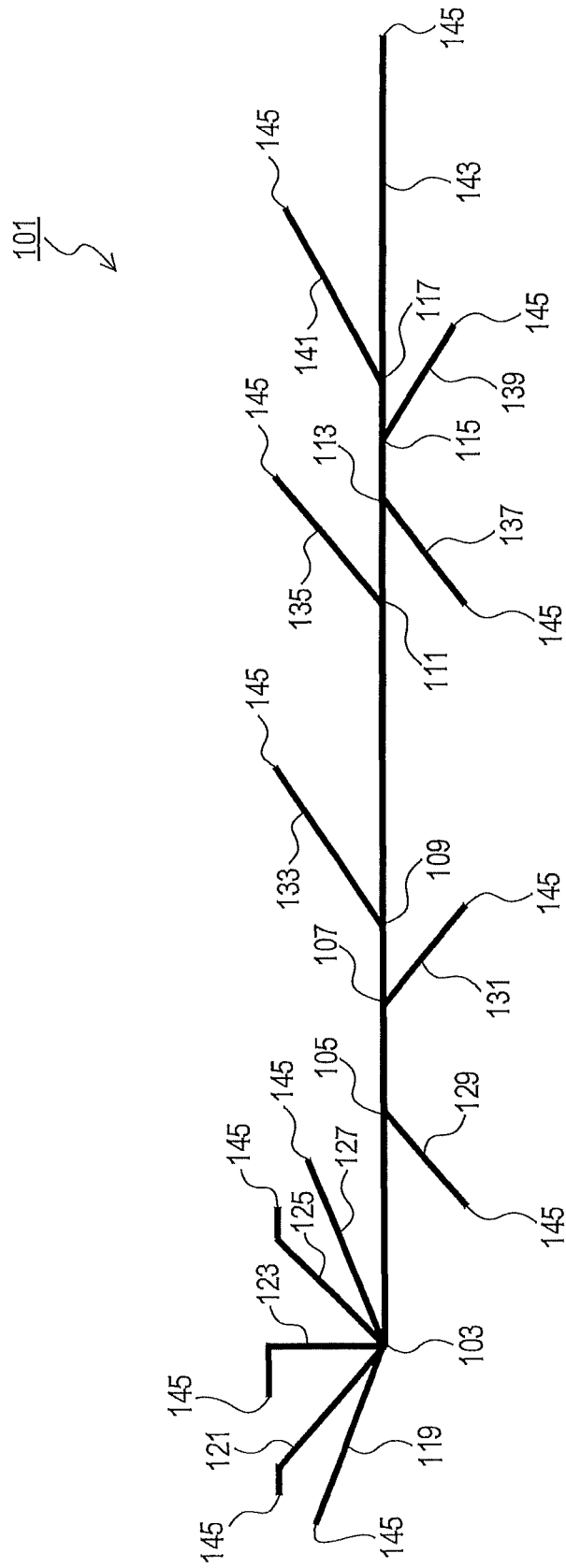
FIG. 1 is an explanatory diagram showing a configuration of a wire harness.

A drawing creation method of the present disclosure will be described. A drawing created by the drawing creation method is a drawing showing a wire harness.

(1-1) Configuration of Wire Harness

A configuration of a wire harness 101 shown by a drawing will be described. The wire harness 101 is configured with wires bundled together. For example, as shown in FIG. 1, the wire harness 101 comprises wire branch points 103, 105, 107, 109, 111, 113, 115, and 117; and branch lines 119, 121, 123, 125, 127, 129, 131, 133, 135, 137, 139, 141, and 143. Each wire branch point is a position where part of the wires branches off. Each branch line is a portion extending from an end 145 of the wire(s) to the corresponding adjacent wire branch point. For example, the branch line 119 is a portion extending from the end 145 thereof to the wire branch point 103.

(1-2) Vehicle Drawing and Wiring Table

Figure 2:
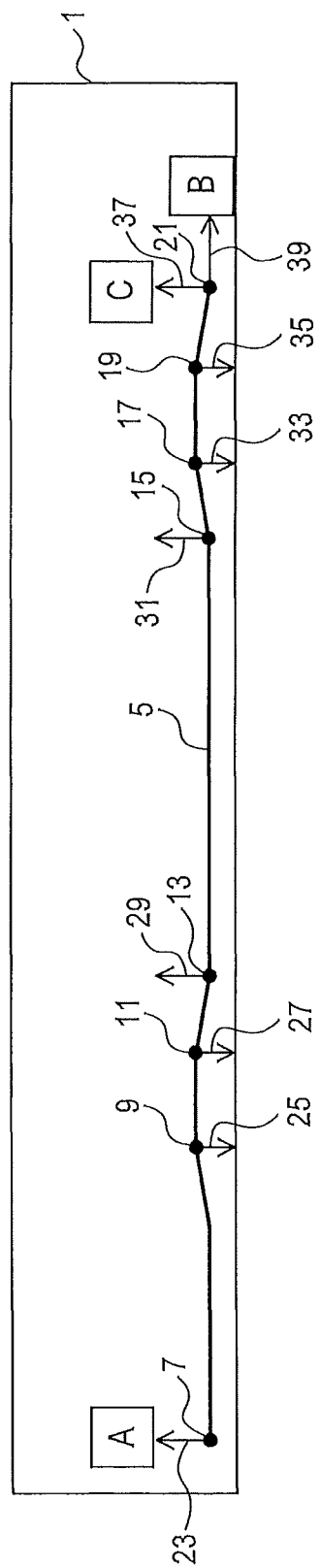
FIG. 2 is an explanatory diagram showing a vehicle drawing.

In the drawing creation method of the present disclosure, firstly, a vehicle drawing 1 shown in FIG. 2 and a wiring table 3 shown in FIG. 3 are prepared. The vehicle drawing 1 is a drawing in which a vehicle is viewed from above. The vehicle corresponds to a movable body. The vehicle drawing 1 shows a path 5 of a wire harness in the vehicle. The path 5 of the wire harness comprises path branch points 7, 9, 11, 13, 15, 17, 19, and 21; and branch paths 23, 25, 27, 29, 31, 33, 35, 37, and 39.

Each of the path branch points 7, 9, 11, 13, 15, 17, 19, and 21 is a position where the corresponding wire branch point of the wire harness running through the path 5 is present. Each of the branch paths 23, 25, 27, 29, 31, 33, 35, 37, and 39 is a portion of the path 5 running from the corresponding path branch point to the corresponding connection target of the wire harness. Also, each of the branch paths 23, 25, 27, 29, 31, 33, 35, 37, and 39 is a portion of the path 5 where the corresponding branch line of the wire harness runs.

The branch path 23 may be a branch path directed to a single connection target, or may be a group of branch paths directed to different connection targets. The same applies to the branch paths 25, 27, 29, 31, 33, 35, 37, and 39.

The vehicle drawing 1 includes a distance between the path branch points. The distance between the path branch points is a distance between adjacent two path branch points on the path 5. An example of the distance between the path branch points is a distance between the path branch point 7 and the path branch point 9. The vehicle drawing 1 includes the distance between the path branch points for every path branch point.

A method of indicating the distance between the path branch points in the vehicle drawing 1 is not limited in particular. For example, the distance between the path branch points in the vehicle drawing 1 may be a distance obtained by multiplying an actual distance between the path branch points by a specified coefficient. The coefficient may be 1, or may be a value greater than or less than 1. A numerical value indicating the distance between the path branch points may be included in the vehicle drawing 1.

The vehicle drawing 1 includes a length of each of the branch paths 23, 25, 27, 29, 31, 33, 35, 37, and 39. If the branch path 23 is a group of branch paths directed to different connection targets, the vehicle drawing 1 includes the length of each branch path. The same applies to the branch paths 25, 27, 29, 31, 33, 35, 37, and 39.

A method of indicating the length of the branch path in the vehicle drawing 1 is not limited in particular. For example, the length of the branch path in the vehicle drawing 1 may be a length obtained by multiplying an actual length of the branch path by a specified coefficient. The coefficient may be 1, or may be a value greater than or less than 1. A numerical value indicating the length of the branch path may be included in the vehicle drawing 1.

The vehicle drawing 1 includes identification information of the connection target of the wire harness for each branch path. Examples of the identification information of the connection target may include a name of the device to be connected to the wire harness, and a combination of the name of the device and a terminal number in the device. "A", "B", and "C" shown in FIG. 3 each represent the name of the corresponding device. "N1" and "N2" shown in FIG. 3 each represent the terminal number in the corresponding device.

If the branch path 23 is a group of branch paths directed to different connection targets, the identification information of the connection target of the wire harness is indicated in the vehicle drawing 1 for each branch path. The same applies to the branch paths 25, 27, 29, 31, 33, 35, 37, and 39.

The wiring table 3 shows the identification information of one connection target and the identification information of the other connection target for each of all wires W1, W2, . . . forming the wire harness. In FIG. 3, for example, "device name: A, terminal number: N1" means that the terminal numbered N1 of the device named A is one connection target of the wire W1. Similarly, in FIG. 3, "device name: B, terminal number: N1" means that the terminal numbered N1 of the device named B is the other connection target of the wire W1. The terminal numbered N1 of the device named A and the terminal numbered N1 of the device named B correspond to the identification information of the connection targets of the wire W1.

(1-3) Identification of Configuration of Each Wire

Figure 4:
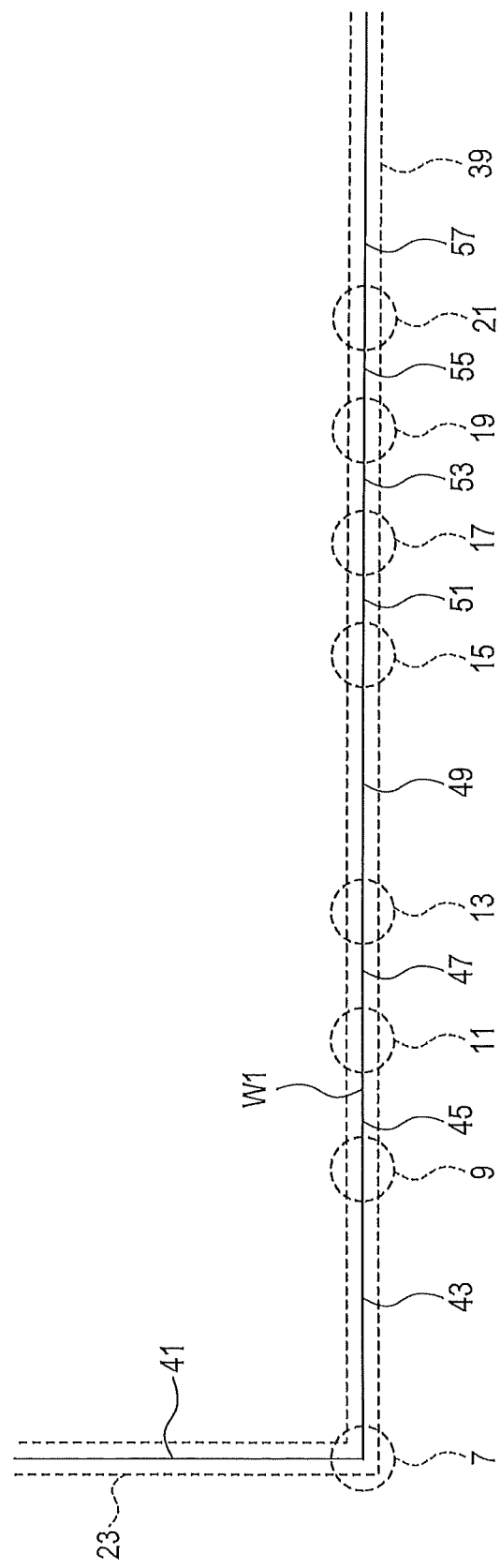
FIG. 4 is an explanatory diagram showing a configuration of a wire.

Cross-check of the identification information of the connection target indicated in the wiring table 3 against the identification information of the connection target of the wire harness indicated in the vehicle drawing 1 enables identification of what portion of the path 5 each wire forming the wire harness runs through. For example, since the wire W1 is connected to the device A and to the device B, as shown in FIG. 4, the wire W1 can be identified as running through a portion formed by the branch path 23, the path branch points 7, 9, 11, 13, 15, 17, 19, and 21, and the branch path 39, of the path 5.

This results in enabling identification of line segments forming the wire W1. The line segment is a portion of a wire present in a single branch path, or a portion of a wire present between adjacent two path branch points. The wire W1 shown in FIG. 4 is formed by line segments 41, 43, 45, 47, 49, 51, 53, 55, and 57. For example, the line segment 41 is a portion of the wire W1 present in the branch path 23. The line segment 43 is a portion of the wire W1 present between the path branch point 7 and the path branch point 9.

If the line segment is a portion present in a single branch path, the length of the line segment is equal to the length of the branch path. If the line segment is a portion present between the adjacent two path branch points, the length of the line segment is equal to the distance between the corresponding path branch points.

Since the vehicle drawing 1 includes every distance between the path branch points and the length of every branch path, the length of every line segment forming the wire W1 can be identified. Thus, it is possible to identify each line segment forming the wire W1 and the length of the line segment. Similarly, for every wire indicated in the wiring table 3, it is possible to identify each line segment forming the wire and the length of the line segment. A method of reading the distance between the path branch points and the length of the branch path from the vehicle drawing 1 may be reading by an operator, or may be reading by a computer through image recognition or character recognition.

(1-4) Creation of Harness Sketch

Figure 5:
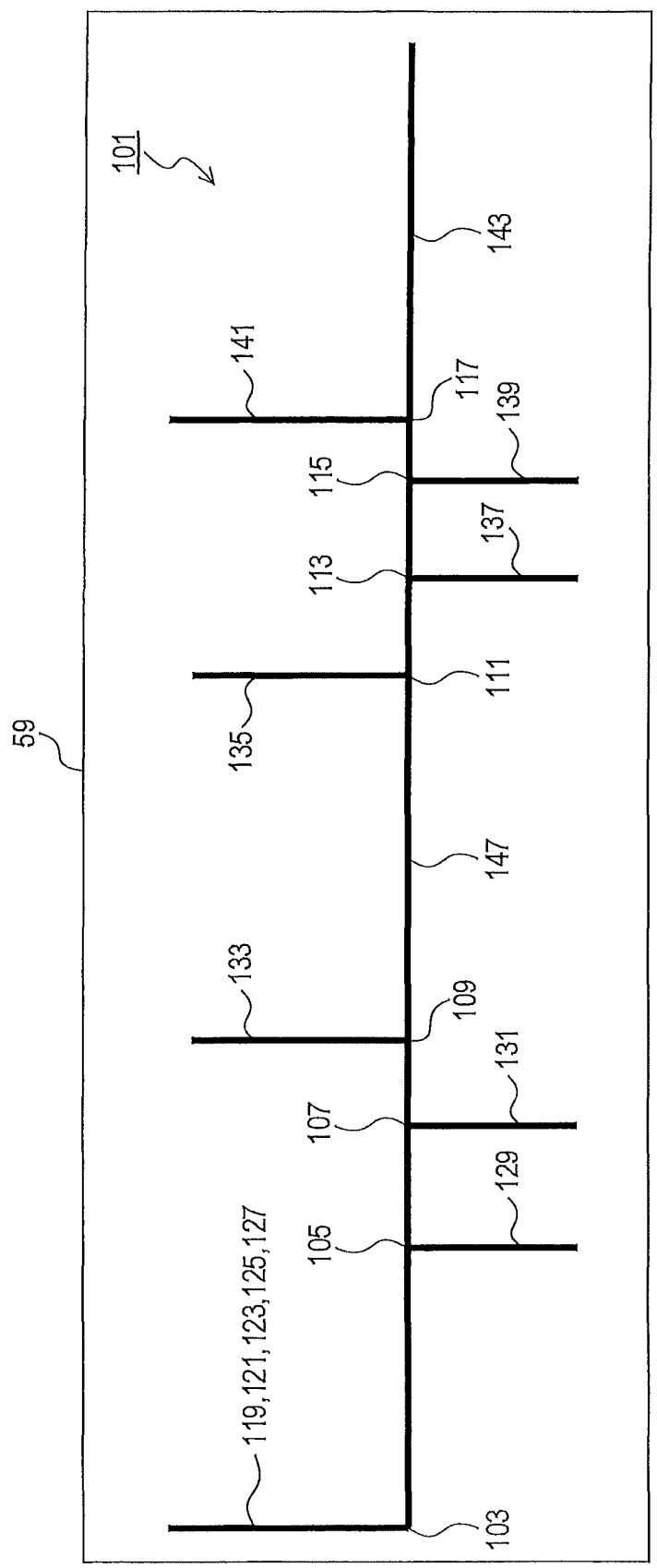
FIG. 5 is an explanatory diagram showing a harness sketch.

The respective wires identified in the above section "(1-3) Identification of Configuration of Each Wire" are depicted in a superposed manner, and a harness sketch 59 shown in FIG. 5 is thereby obtained. When depicting the respective wires in a superposed manner, portions running through the same path branch point are to be superposed on each other.

The harness sketch 59 shows the wire harness 101. In the harness sketch 59, the branch lines 119, 121, 123, 125, and 127 are depicted in a superposed manner. In the harness sketch 59, the branch lines 119, 121, 123, 125, 127, 129, 131, 133, 135, 137, 139, 141, and 143 are perpendicular to a trunk line 147. The trunk line 147 is a portion where multiple wires of the wire harness 101 are bundled together.

The harness sketch 59 reflects each distance between the wire branch points and the length of each branch line of the wire harness 101. In other words, each distance between the wire branch points and the length of each branch line in the harness sketch 59 are equal to those in the actual wire harness 101, or are values enlarged or reduced at a specified rate. The harness sketch 59 corresponds to a drawing created by the drawing creation method of the present disclosure.

(1-5) Creation of Harness Board Drawing

Figure 6:
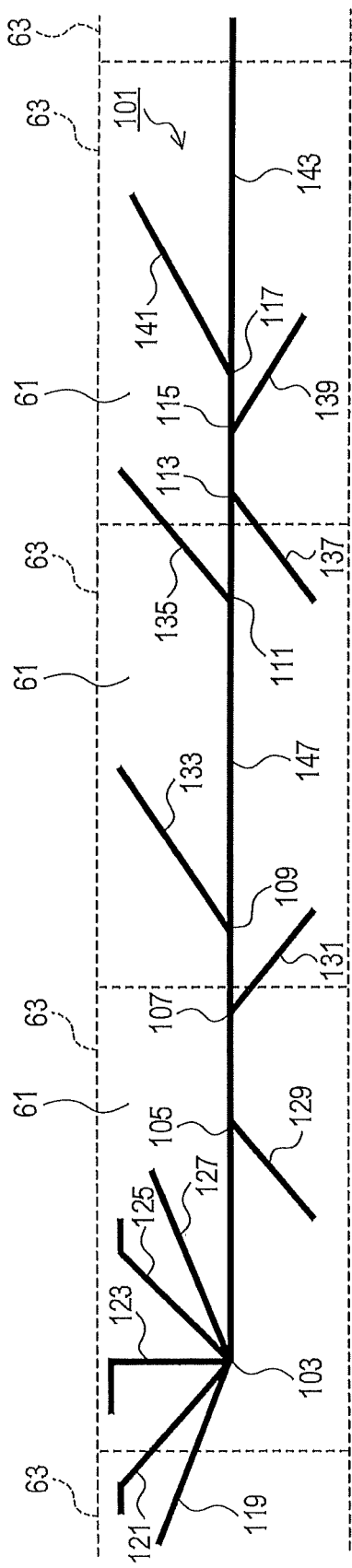
FIG. 6 is an explanatory diagram showing a harness board drawing.

Some modification to the harness sketch 59 results in obtaining harness board drawings 61 shown in FIG. 6. In one of the harness board drawings 61, the branch lines 119, 121, 123, 125, and 127 are shown shifted so as not to be superposed on each other. Further, an angle formed by each of the branch lines 119, 121, 123, 125, 127, 129, 131, 133, 135, 137, 139, 141, and 143; and the trunk line 147 is an acute angle. This enables reduction of a size of the harness board drawings 61 in a widthwise direction. The widthwise direction is a direction perpendicular to the trunk line 147.

Each harness board drawing 61 may be a drawing depicted on a medium such as paper, or may be a drawing displayed on a display. For example, as shown in FIG. 6, the harness board drawings 61 may be displayed on a harness board including, on an upper surface thereof, displays 63.

Figure 8:
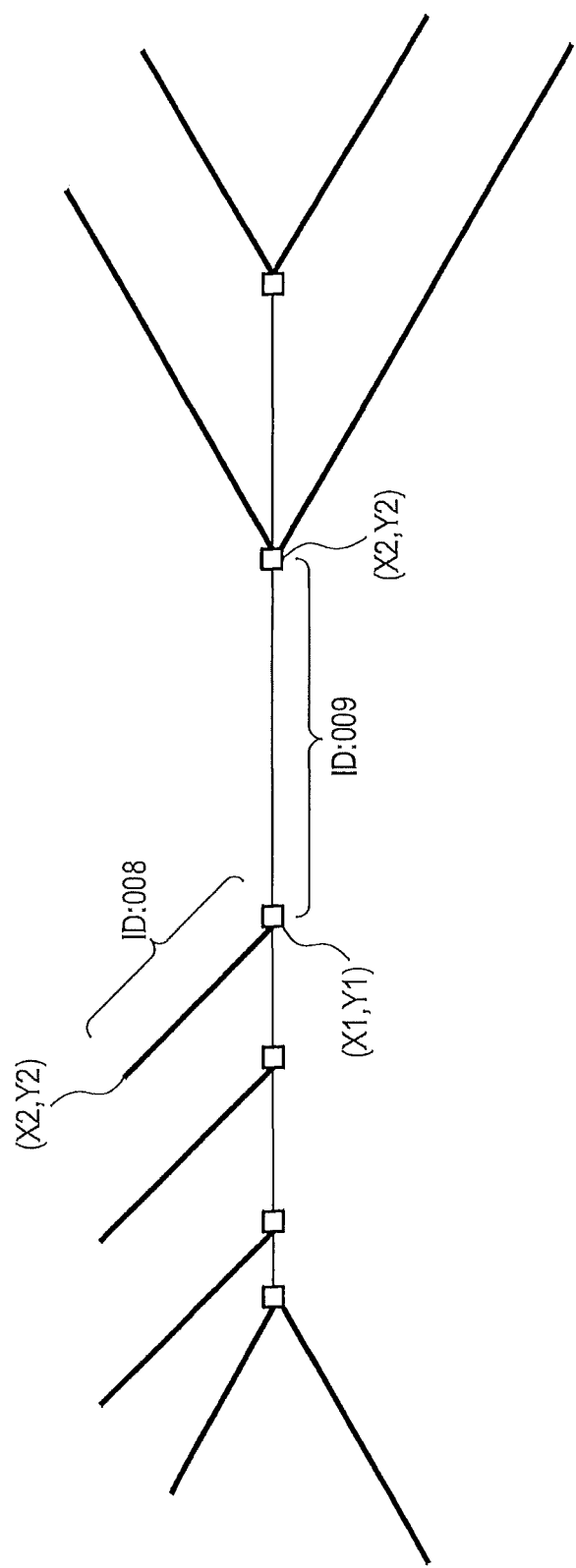
FIG. 8 is an explanatory diagram showing an example of contents specified by the line segment information.

The harness sketch 59 and the harness board drawings 61 can be specified based on line segment information shown in FIG. 7. The line segment information includes the length of the line segment and coordinates of both ends of the line segment for every line segment forming the wire harness 101. "ID" in FIG. 7 is an ID of each line segment. "Length" in FIG. 7 is a length of each line segment. A value of the "Length" is preferably an integer value obtained by rounding up digits after a decimal point. "X1" and "Y1" in FIG. 7 are coordinates of one end of each line segment. "X2" and "Y2" in FIG. 7 are coordinates of the other end of the line segment. Shown in FIG. 8 is an example of the coordinates of the both ends of a line segment having "ID: 008" and the coordinates of the both ends of a line segment having "ID: 009". The line segment information may further include dimension tolerance, information on extra length, and so on.

For example, the line segment information shown in FIG. 7 can be output to the harness board. The thus-output line segment information enables the harness board to display the harness board drawings 61 on the displays 63 as shown in FIG. 6.

If the size of the wire harness 101 indicated by the line segment information is not an actual size, the harness board allows the size of the harness board drawings 61 displayed on the displays 63 to be the actual size by enlarging or reducing the harness board drawings 61. The harness board drawing 61 corresponds to a drawing created by the drawing creation method of the present disclosure.

2. Wire Harness Manufacturing Method

As shown in FIG. 6, the harness board drawings 61 are displayed on the displays 63 of the harness board. Wires are wired on the harness board drawings 61 and bundled together by a binding member, such as a tape and/or a tube, to thereby manufacture the wire harness 101.

3. Effects Produced by Drawing Creation Method and Wire Harness Manufacturing Method (1A) The drawing creation method of the present disclosure enables easy and accurate creation of the harness sketch 59 and the harness board drawing 61.

(1B) The wire harness manufacturing method of the present disclosure utilizes the drawing created by the drawing creation method of the present disclosure. The drawing created by the drawing creation method of the present disclosure is accurate as described above. Thus, the wire harness manufacturing method of the present disclosure enables accurate manufacturing of the wire harness 101.

Figure 9:
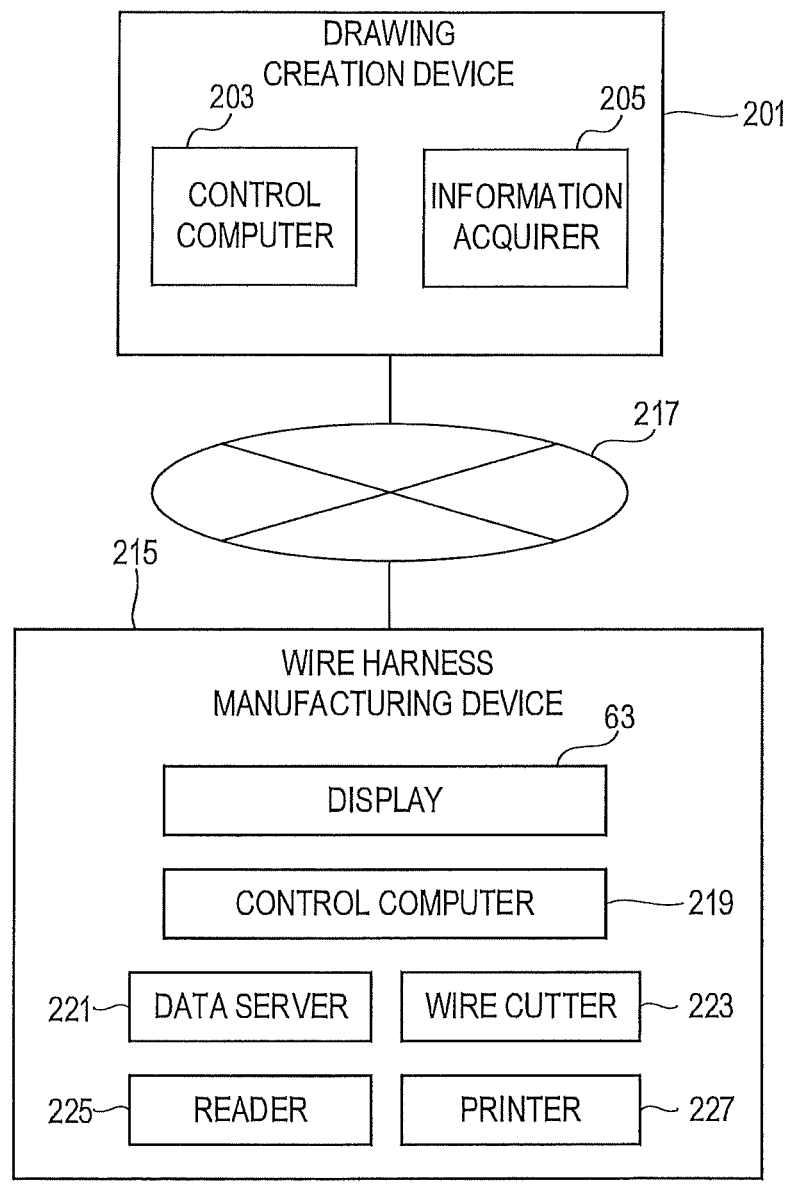
FIG. 9 is a block diagram showing configurations of a drawing creation device and a wire harness manufacturing device.

4. Configurations of Drawing Creation Device and Wire Harness Manufacturing Device The above-described drawing creation method can be performed by, for example, a drawing creation device 201 shown in FIGS. 9 and 10. As shown in FIG. 9, the drawing creation device 201 comprises a control computer 203 and an information acquirer 205.

Figure 10:
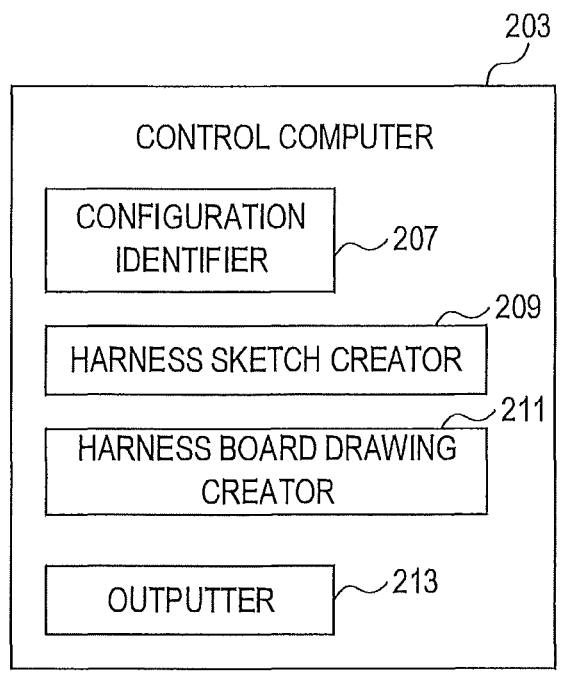
FIG. 10 is a block diagram showing a functional configuration of a control computer.

As shown in FIG. 10, the control computer 203 functionally comprises a configuration identifier 207, a harness sketch creator 209, a harness board drawing creator 211, and an outputter 213. The configuration identifier 207, the harness sketch creator 209, and the harness board drawing creator 211 correspond to a drawing creator. The drawing creation device 201 is connected to a wire harness manufacturing device 215 via a network 217.

The information acquirer 205 reads the contents of the vehicle drawing 1 and the wiring table 3. The information acquirer 205 is configured with, for example, a scanner and/or a camera. The configuration identifier 207 identifies each line segment forming the wire and the length of the line segment for every wire indicated in the wiring table 3 by the method described in the above section "(1-3) Identification of Configuration of Each Wire", based on the contents of the vehicle drawing 1 and the wiring table 3 acquired by the information acquirer 205.

The harness sketch creator 209 creates the harness sketch 59 by the method described in the above section "(1-4) Creation of Harness Sketch". The harness board drawing creator 211 creates the harness board drawing 61 by the method described in the above section "(1-5) Creation of Harness Board Drawing". The harness sketch 59 and the harness board drawing 61 created by the drawing creation device 201 are electronic data.

The outputter 213 outputs the harness board drawing 61 to the wire harness manufacturing device 215 via the network 217.

The above-described wire harness manufacturing method can be performed by, for example, the wire harness manufacturing device 215. The wire harness manufacturing device 215 comprises the display 63 of the harness board, a control computer 219, a data server 221, a wire cutter 223, a reader 225, and a printer 227.

The displays 63 can display the harness board drawings 61 created by the drawing creation device 201 as shown in FIG. 6. Wires are wired on the displayed harness board drawings 61, and bundled together by a binding member, such as a tape and/or a tube, to thereby manufacture the wire harness 101. The control computer 219 controls relevant portions in the wire harness manufacturing device 215.

The data server 221 stores information on manufacturing of the wire harness 101, such as operation history and inspection results. The data server 221 further stores the harness board drawings 61.

The wire cutter 223 cuts the wires used for manufacturing the wire harness 101 into desired specified lengths. The wires to be cut are unreeled from, for example, a not-shown supply reel.

The reader 225 optically reads an identifier, such as a bar code, indicated on the wire to be placed on the harness board. The printer 227 prints a label to be affixed on the cut wire or on the wire harness 101. The label is used for identification of the wire, or the like.

5. Effects Produced by Drawing Creation Device and Wire Harness Manufacturing Device (2A) The drawing creation device 201 can create the harness sketch 59 and the harness board drawing 61 easily and accurately.

(2B) The wire harness manufacturing device 215 utilizes the drawing created by the drawing creation device 201. The drawing created by the drawing creation device 201 is accurate as described above. Thus, the wire harness manufacturing device 215 enables accurate manufacturing of the wire harness 101.

6. Other Embodiments

Although the embodiment of the present disclosure has been described so far, the present disclosure is not limited to the above-described embodiment, and can be practiced in variously modified manners.

(1) In the above-described embodiment, the wire harness 101 is assumed to be one used for an automobile. However, the wire harness 101 may be one used for a movable body other than the automobile. Examples of the movable body other than the automobile may include a ship, an aircraft, and a railroad car.

(2) The harness board drawing 61 may further include other information. Exampled of such other information may include identification information of the connection target of each wire, and information indicating a value of the dimension of each wire.

(3) The harness board drawing 61 shown in FIG. 6 may include the device name and/or the terminal number corresponding to each harness and each wire, which can be identified from the wiring table 3. A position where the device name is indicated in the harness board drawing 61 may be, for example, a position where the corresponding harness branches. A position where the terminal number is indicated in the harness board drawing 61 may be, for example, a position of an end of the corresponding wire.

(4) The wiring table 3 may include information on a connector connected to each wire. The information on the connector corresponding to each wire may be indicated in the harness board drawing 61. A position where the information on the connector is indicated in the harness board drawing 61 may be, for example, a position of an end of the corresponding wire.

(5) The function performed by a single element in the above-described embodiments may be performed by two or more elements, and the function performed by two or more elements may be performed by a single element. Part of the configuration of the above-described embodiments may be omitted. At least part of the configuration of the above-described embodiments may be added to or replaced by the configuration of the above-described other embodiments.

(6) The present disclosure may also be practiced in various manners other than the drawing creation method and the wire harness manufacturing method described above.

What is claimed is:

1. A drawing creation method using a computer, the method comprising:
   creating a drawing showing a wire harness configured with wires bundled together, the wire harness including:
      wire branch points where part of the wires branches off; and
      branch lines each extending from an end of corresponding one of the wires to corresponding one of the wire branch points, and
   acquiring information including following [1] to [5] by an information acquirer including a scanner or a camera:
      [1] a path of the wire harness in a movable body;
      [2] a distance between the wire branch points;
      [3] a length from each of the wire branch points to a corresponding connection target of the wire harness;
      [4] identification information of the connection target of the wire harness; and
      [5] identification information of the connection target of each of the wires,
   wherein the acquiring includes reading, by the information acquirer, the distance between the wire branch points and the length of each of the branch lines through image recognition or character recognition from a vehicle drawing showing the path of the wire harness in the movable body, the vehicle drawing including information of the distance between the wire branch points, information of the length of each of the branch lines, and the identification information of the connection target of the wire harness, and
   wherein the creating the drawing includes:
      creating, using the computer, the drawing showing the wire harness, the drawing reflecting the distance between the wire branch points and the length of each of the branch lines, based on the information acquired by the information acquirer;
      identifying a path of each of the wires in the wire harness by cross-checking the identification information of the connection target of the wires included in a wiring table against the identification information of the connection target of the wire harness included in the vehicle drawing, the wiring table including the identification information of the connection target of all the wires forming the wire harness; and
      identifying the distance between the wire branch points and the length of each of the branch lines, based on the information read by the information acquirer.

2. The drawing creation method according to claim 1, wherein the branch lines branching off at a same wire branch point are shown shifted so as not to be superposed on each other in the drawing.

3. The drawing creation method according to claim 1, wherein the acquiring by the information acquirer includes:
acquiring information indicated in the vehicle drawing as information of the above (1) to (4); and
acquiring information indicated in the wiring table as information of the above (5).

4. A wire harness manufacturing method comprising:
creating a drawing by a drawing creation method according to claim 1; and
wiring wires on the drawing.

5. A drawing creation device comprising:
a drawing creator configured to create a drawing showing a wire harness configured with wires bundled together, the wire harness including:
   wire branch points where part of the wires branches off; and
   branch lines each extending from an end of corresponding one of the wires to corresponding one of the wire branch points; and
an information acquirer configured to acquire information including following [1] to [5], the information acquirer including a scanner or a camera:
   [1] a path of the wire harness in a movable body;
   [2] a distance between the wire branch points;
   [3] a length from each of the wire branch points to a corresponding connection target of the wire harness;
   [4] identification information of the connection target of the wire harness; and
   [5] identification information of the connection target of each of the wires,
wherein the information acquirer reads the distance between the wire branch points and the length of each of the branch lines through image recognition or character recognition from a vehicle drawing showing the path of the wire harness in the movable body, the vehicle drawing including information of the distance between the wire branch points, information of the length of each of the branch lines, and the identification information of the connection target of the wire harness,
wherein the drawing creator is configured with a computer configured to create the drawing showing the wire harness, the drawing reflecting the distance between the wire branch points and the length of each of the branch lines, based on the information acquired by the information acquirer,
wherein the drawing creator identifies a path of each of the wires in the wire harness by cross-checking the identification information of the connection target of the wires included in a wiring table against the identification information of the connection target of the wire harness included in the vehicle drawing, the wiring table including the identification information of the connection target of all the wires forming the wire harness, and
wherein the drawing creator identifies the distance between the wire branch points and the length of each of the branch lines, based on the information read by the information acquirer.

6. The drawing creation device according to claim 5, wherein the information acquirer is configured to acquire information indicated in the vehicle drawing as information of the above (1) to (4), and is configured to acquire information indicated in the wiring table as information of the above (5).

* * * * *